(12) United States Patent
Agiwal et al.

(10) Patent No.: US 10,993,270 B2
(45) Date of Patent: Apr. 27, 2021

(54) METHOD AND APPARATUS FOR PERFORMING RANDOM ACCESS BACKOFF IN WIRELESS COMMUNICATION SYSTEM

(71) Applicant: Samsung Electronics Co., Ltd., Suwon-si (KR)

(72) Inventors: Anil Agiwal, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/445,988

(22) Filed: Jun. 19, 2019

(65) Prior Publication Data

US 2019/0387541 A1 Dec. 19, 2019

Related U.S. Application Data

(60) Provisional application No. 62/686,796, filed on Jun. 19, 2018.

(51) Int. Cl.
*H04L 12/28* (2006.01)
*H04W 74/08* (2009.01)
(Continued)

(52) U.S. Cl.
CPC ....... *H04W 74/085* (2013.01); *H04W 74/006* (2013.01)

(58) Field of Classification Search
CPC ............. H04W 4/0833; H04W 74/085; H04W 74/0833
(Continued)

(56) References Cited

U.S. PATENT DOCUMENTS

2010/0202288 A1  8/2010 Park et al.
2014/0362794 A1  12/2014 Zhao et al.
(Continued)

FOREIGN PATENT DOCUMENTS

WO  2017/212443 A1  12/2017

OTHER PUBLICATIONS

Ericsson; On multiple preamble transmissions for contention free random access; 3GPP TSG-RAN WG1 Meeting #93; Tdoc R1-1806428; May 21-25, 2018; Busan, Korea.
(Continued)

*Primary Examiner* — John Pezzlo
(74) *Attorney, Agent, or Firm* — Jefferson IP Law, LLP

(57) ABSTRACT

A communication method and system for converging a 5th-Generation (5G) communication system for supporting higher data rates beyond a 4th-Generation (4G) system with a technology for internet of things (IoT). The present disclosure may be applied to intelligent services based on the 5G communication technology and the IoT-related technology. The present disclosure provides a method and an apparatus for performing a random access by a terminal in a wireless communication system by starting a backoff timer for a random access preamble retransmission, determining whether a criterion to select a contention free random access resource is met during the backoff timer, selecting a random access resource for a transmission of a random access preamble when the criterion is met during the backoff timer, and transmitting, to a base station, the random access preamble in the selected random access resource.

20 Claims, 13 Drawing Sheets

(51) Int. Cl.
*H04W 74/00* (2009.01)
*H04J 1/16* (2006.01)

(58) Field of Classification Search
USPC ........................................ 370/278, 329, 445
See application file for complete search history.

(56) References Cited

U.S. PATENT DOCUMENTS

| 2015/0124679 | A1 | 5/2015 | Yi et al. |
| 2017/0265230 | A1 | 9/2017 | Liu et al. |
| 2019/0182870 | A1* | 6/2019 | Shih .................... H04W 74/004 |
| 2019/0215888 | A1* | 7/2019 | Cirik .................... H04B 7/0695 |
| 2019/0261411 | A1* | 8/2019 | Chin ................. H04W 74/0833 |

OTHER PUBLICATIONS

International Search Report with Written Opinion dated Oct. 1, 2019; International Appln. No. PCT/KR2019/007401.

* cited by examiner

METHOD AND APPARATUS FOR PERFORMING RANDOM ACCESS BACKOFF IN WIRELESS COMMUNICATION SYSTEM

CROSS-REFERENCE TO RELATED APPLICATION(S)

This application is based on and claims priority under 35 U.S.C. 119(e) of a U.S. Provisional application Ser. No. 62/686,796, filed on Jun. 19, 2018, in the U.S. Patent and Trademark Office, the disclosure of which is incorporated by reference herein in its entirety.

BACKGROUND

1. Field

The disclosure relates to a wireless communication system. More particularly, the disclosure relates to an apparatus, a method and a system for performing a random access backoff in a wireless communication system.

2. Description of Related Art

To meet the demand for wireless data traffic having increased since deployment of 4th-generation (4G) communication systems, efforts have been made to develop an improved 5th-generation (5G) or pre-5G communication system. Therefore, the 5G or pre-5G communication system is also called a 'Beyond 4G Network' or a 'Post LTE System'. The 5G communication system is to be implemented in higher frequency millimeter wave (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beam forming, and large scale antenna techniques are discussed in 5G communication systems. In addition, in 5G communication systems, development for system network improvement is underway based on advanced small cells, cloud radio access networks (RANs), ultra-dense networks, device-to-device (D2D) communication, wireless backhaul, moving network, cooperative communication, coordinated multi-points (COMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology, have been developed.

Further, the Internet, which is a human centered connectivity network where humans generate and consume information, is now evolving into the Internet of Things (IoT) where distributed entities, such as things, exchange and process information without human intervention. The Internet of everything (IoE), which is a combination of the IoT technology and the Big Data processing technology through connection with a cloud server, has also emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth, have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud radio access network (RAN) as the above-described Big Data processing technology may also be considered to be an example of convergence between the 5G technology and the IoT technology.

Still further, there has been various studies on random access procedure for 5G communication systems.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below. Accordingly, an aspect of the disclosure is to provide a method and an apparatus for performing a random access backoff in wireless communication systems.

Additional aspects will be set forth in part in the description which follows and, in part, will be apparent from the description, or may be learned by practice of the presented embodiments.

In accordance with an aspect of the disclosure, a method by a terminal for performing a random access is provided. The method includes starting a backoff timer for a random access procedure, determining whether a criterion to select a contention free random access resource is met during the backoff timer, selecting a random access preamble associated with the contention free random access resource when the criterion is met during the backoff timer, and transmitting, to a base station, the random access preamble.

In accordance with another aspect of the disclosure, a terminal for performing a random access is provided. The terminal includes a transceiver configured to transmit and receive a signal, and a controller configured to start a backoff timer for a random access procedure, determine whether a criterion to select a contention free random access resource is met during the backoff timer, select a random access preamble associated with the contention free random access resource when the criterion is met during the backoff timer, and transmit, to a base station, the random access preamble.

In accordance with another aspect of the disclosure, a method by a base station for performing a random access is provided. The method includes transmitting, to a terminal, a backoff timer for a random access procedure, and receiving, from the terminal, a random access preamble, wherein whether a criterion to select a contention free random access resource is met is determined during the backoff timer, and wherein the random access preamble associated with the contention free random access resource is selected when the criterion is met during the backoff timer.

In accordance with another aspect of the disclosure, a base station for performing a random access is provided. The base station includes a transceiver configured to transmit and receive a signal, and a controller configured to transmit, to a terminal, a backoff timer for a random access procedure, and receive, from the terminal, a random access preamble, wherein whether a criterion to select a contention free random access resource is met is determined during the backoff timer, and wherein the random access preamble associated with the contention free random access resource is selected when the criterion is met during the backoff timer.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
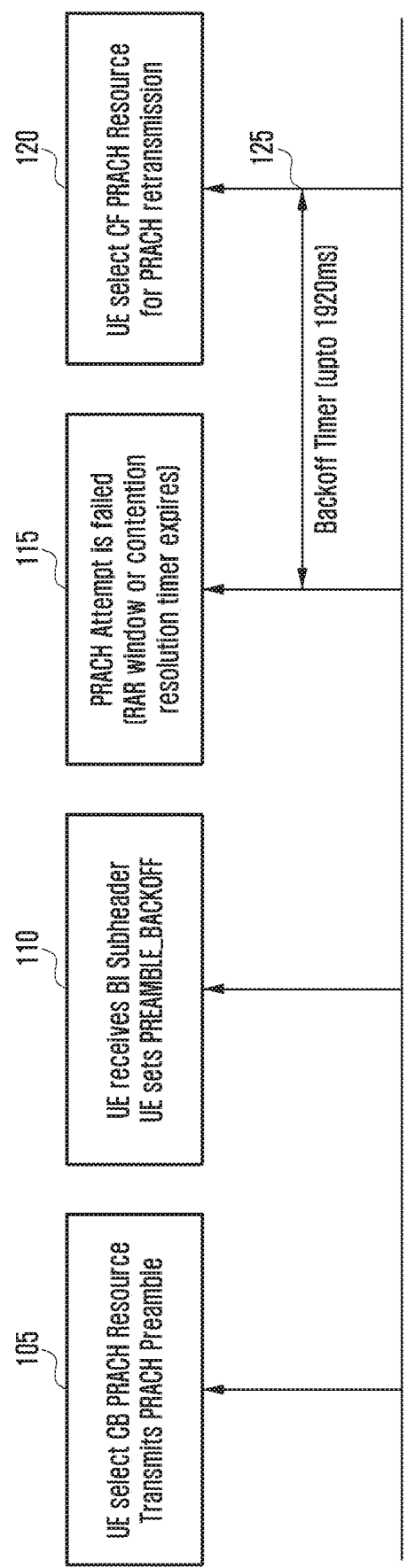
FIG. 1 illustrates a transmission of a contention free random access preamble according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only, and not for the purpose of limiting the disclosure as defined by the appended claims and their equivalents.

It is to be understood that the singular forms "a", "an", and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like, may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may also refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

As used herein, a "base station (BS)" is preferably an entity communicating with a user equipment (UE) and may be referred to as BS, base transceiver station (BTS), node B (NB), evolved NB (eNB), access point (AP), 5G NB (5GNB), or gNB.

As used herein, a "UE" is preferably an entity communicating with a BS and may be referred to as UE, device, mobile station (MS), mobile equipment (ME), or terminal.

The 5G wireless communication system will be implemented not only in lower frequency bands, but also in higher frequency millimeter wave (mmWave) bands, e.g., 10 GHz to 100 GHz bands, so as to accomplish higher data rates. To mitigate propagation loss of the radio waves and increase the transmission distance, beamforming, massive MIMO, full dimensional MIMO (FD-MIMO), array antenna, analog beam forming, and large scale antenna techniques are being considered in the design of 5G wireless communication system. In addition, the 5G wireless communication system is expected to address different use cases having different requirements in terms of data rate, latency, reliability, mobility, etc. However, it is expected that the design of the air-interface of the 5G wireless communication system would be flexible enough to serve UEs having different capabilities depending on the use case and market segment where the UE caters services to an end customer. Example use cases that the 5G wireless communication system wireless system is expected to address include enhanced mobile broadband (eMBB), massive machine type communication (m-MTC), ultra-reliable low latency communication (URLL), etc. The eMBB requirements such as tens of Gbps data rate, low latency, high mobility, and so forth, address the market segment representing the conventional wireless broadband subscribers needing internet connectivity everywhere, all the time, and on the go. The m-MTC requirements such as very high connection density, infrequent data transmission, very long battery life, low mobility address, and so forth, address the market segment representing the IoT/IoE envisioning connectivity of billions of devices. The URLL requirements such as very low latency, very high reliability and variable mobility, and so forth, address the market segment representing the Industrial automation application, vehicle-to-vehicle/vehicle-to-infrastructure communication foreseen as one of the enabler for autonomous cars.

In the 5G (also referred to as NR or New Radio) wireless communication system, random access (RA) procedure is used to achieve uplink time synchronization. An RA procedure is used during initial access, handover, radio resource control (RRC) connection re-establishment procedure, scheduling request transmission, secondary cell group (SCG) addition/modification and data or control information transmission in uplink by non-synchronized UE in RRC CONNECTED state.

During the RA procedure, a UE first transmits random access preamble (also referred as Msg1) and then waits for a random access response (RAR) or Msg2 in the RAR window corresponding to its random access preamble transmission. A gNB (i.e., base station) transmits the RAR on a physical downlink shared channel (PDSCH) addressed to a RA-Radio network temporary identifier (RA-RNTI). The RA-RNTI identifies the time-frequency resource (also referred as physical random access channel (PRACH) Occasion, PRACH TX occasion or random access channel (RACH) Occasion) in which the random access preamble was detected by the gNB. Several RARs for various random access preambles detected by the gNB can be multiplexed in the same RAR medium access control (MAC) protocol data unit (PDU) by the gNB. An RAR in MAC PDU corresponds to the UE's random access preamble transmission if it includes the random access preamble ID (RAPID) of random access preamble transmitted by it. If the RAR corresponding to its random access preamble transmission is not received during the RAR window and the UE has not yet transmitted the random access preamble for a configurable (configured by the gNB in RACH configuration) number of times, the UE retransmits the random access preamble.

If the RAR corresponding to its random access preamble transmission is received and the UE has transmitted a dedicated random access preamble, the RA procedure is considered to be successful. If the UE has transmitted a non-dedicated (i.e. contention based) random access preamble then upon successful reception of the RAR, the UE transmits Msg3 in uplink (UL) grant received in the RAR. The Msg3 includes a message such as an RRC connection request, RRC connection re-establishment request, RRC handover confirm, scheduling request, etc. It also includes the UE identity (i.e. Cell-RNTI (C-RNTI) or system architecture evolution-temporary mobile subscriber identity (S-TMSI) or a random number). After transmitting the Msg3, the UE starts a contention resolution timer. While the contention resolution timer is running, if the UE receives a physical downlink control channel (PDCCH) addressed to C-RNTI included in the Msg3, the contention resolution is considered successful, the contention resolution timer is stopped and the RA procedure is completed. While the contention resolution timer is running, if the UE receives a contention resolution MAC control element (CE) including the UE's Contention Resolution Identity (first X bits of common control channel (CCCH) service data unit (SDU) transmitted in Msg3), the contention resolution is considered to be successful, the contention resolution timer is stopped and the RA procedure is completed. If the contention resolution timer expires and the UE has not yet transmitted the random access preamble for a configurable number of times, the UE retransmits the random access preamble.

In some cases, there may be congestion on the PRACH channel and to ease congestion, the gNB transmits a backoff indicator in the RAR MAC PDU. The UE then applies backoff during random access preamble retransmission i.e. it retransmits random access preamble after a time period which is randomly selected between 0 and a backoff value or between 0 and {scaling factor}*{backoff value}. The scaling factor can be signaled by the gNB for one or more events (such as handover, beam failure recovery, etc.) which trigger random access. If the scaling factor is not signaled, it is assumed to be 1. The backoff value is obtained by the UE from a backoff table (pre-defined) corresponding to a backoff index (BI) received in the RAR MAC PDU. According to the current backoff procedure, if RAR corresponding to its random access preamble transmission is not received during the RAR window and the UE has not yet transmitted the random access preamble for a configurable number of times and if in the ongoing RA procedure random access preamble was selected amongst the contention based random access preambles, the UE selects a random backoff time according to a uniform distribution between 0 and the backoff value or between 0 and {scaling factor}*{backoff value} and delays the subsequent random access preamble transmission by the selected backoff time. Additionally, if the contention resolution timer expires during RA procedure and the UE has not yet transmitted the random access preamble for a configurable number of times, the UE selects a random backoff time according to a uniform distribution between 0 and the backoff value or between 0 and {scaling factor}*{backoff value} and delays the subsequent random access preamble transmission by the selected backoff time.

FIG. 1 illustrates a transmission of a contention free random access preamble according to an embodiment of the disclosure.

Referring to FIG. 1, if a UE is configured with contention free random access resources, a Nth random access preamble transmission during an RA procedure can be based on a contention based random access preambles 105, 110, and 115. Any subsequent (N+1th) random access preamble transmission can be based on a contention free random access preamble 120 as shown in FIG. 1. A current backoff procedure 125 unnecessarily delays the N+1th random access preamble transmission if the UE has received backoff indication from a gNB after transmitting the Nth random access preamble transmission 105, and 110. In this case, the UE selects a contention free random access preamble if there is at least one suitable synchronization signal block (SSB)/channel state information reference signal (CSI-RS) for which contention free random access resources is available.

Figure 2:
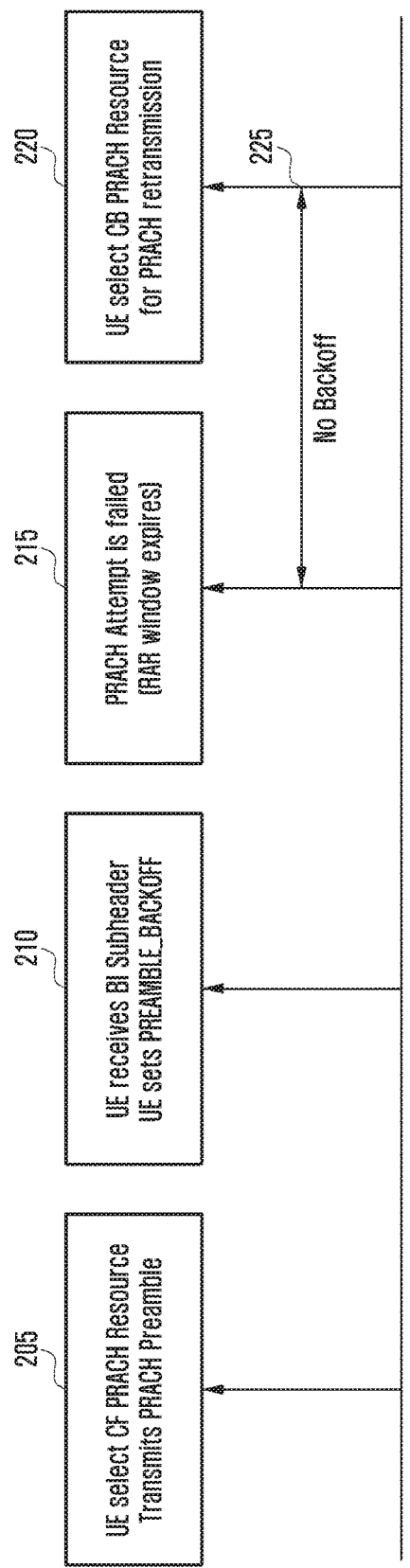
FIG. 2 illustrates a transmission of a contention based random access preamble according to an embodiment of the disclosure.

FIG. 2 illustrates a transmission of a contention based random access preamble according to an embodiment of the disclosure.

Referring to FIG. 2, a UE is configured with contention free random access resources 205, and the Nth random access preamble transmission can be based on contention free random access preambles 210, 215, and 220. Any subsequent (N+1th) random access preamble transmission can be based on contention based random access preamble 220 as shown in FIG. 2. Since the UE is retransmitting using contention based random access preamble, backoff should be applied before the N+1th transmission. However, backoff is not applied in the current backoff procedure 225 which may lead to more collisions and hence more delay.

In accordance with an aspect of the disclosure, an enhanced method of random access backoff is provided.

Embodiment 1

Figure 3:
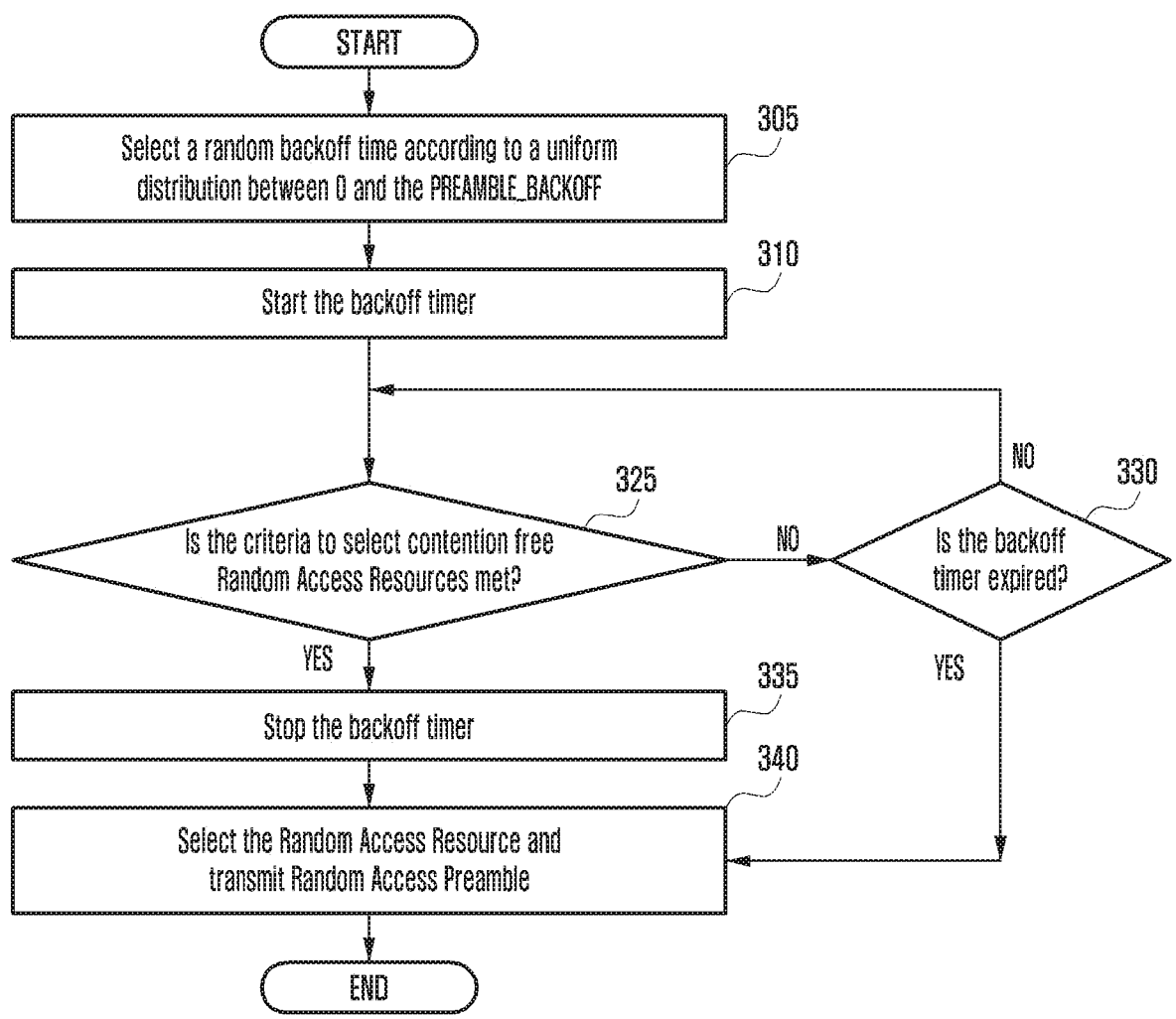
FIG. 3 is a flowchart of an operation for a random access backoff during a random access procedure according to an embodiment of the disclosure.

FIG. 3 is a flowchart of an operation for a random access backoff during a random access procedure according to an embodiment of the disclosure.

Referring to FIG. 3, in an embodiment, a UE performs this operation if an RAR corresponding to its random access preamble transmission is not received during the RAR window and the UE has not yet transmitted the random access preamble for a configurable number of times (preambleTransMax configured by a gNB via RRC signaling) during the RA procedure. In an embodiment, the UE also performs this operation if a contention resolution timer expires during the RA procedure and the UE has not yet transmitted the random access preamble for a configurable number of times (preambleTransMax configured by the gNB via RRC signaling) during the RA procedure. In an embodiment, the UE also performs this operation if the RAR corresponding to its random access preamble transmission is not received during the RAR window and backoff indicator is received in the RAR and the UE has not yet transmitted the random access preamble for a configurable number of times (preambleTransMax configured by the gNB via RRC signaling) during the RA procedure. In an embodiment, the UE also performs this operation if the contention resolution timer expires during the RA procedure and backoff indicator is received in the RAR and the UE has not yet transmitted the random access preamble for a configurable number of times (preambleTransMax configured by the gNB via RRC signaling) during the RA procedure. In an embodiment, in a 2 step RACH procedure, the UE also performs this operation if network response indicating either to transmit an Msg3 or indicating successful reception of an MsgA transmitted by the UE, is not received during the response window and backoff indicator is received in a network response and the UE has not yet transmitted the random access preamble for a configurable number of times (preambleTransMax configured by the gNB via RRC signaling) during the RA procedure.

In operation 305, the UE elects a random backoff time according to a uniform distribution between 0 and the PREAMBLE_BACKOFF. The PREAMBLE_BACKOFF is set to a backoff value or to a scaling factor*backoff value if a scaling factor is configured by a gNB for ongoing random access procedure. The backoff value is obtained by the UE from a backoff table corresponding to a backoff index received from the gNB during this random access procedure.

In operation 310, the UE starts a backoff timer for a determined backoff time.

In operation 325, it is determined if the criteria to select contention-free random access resources is met while the backoff timer is running.

If yes, the UE stops the backoff timer at operation 335.

If no, the UE looks to see if the backoff timer expired at operation 330, and if yes, performs the random access resource selection (i.e. select the random access preamble and RACH occasion) and transmits the random access preamble at operation 340. Since the criteria to select contention free random access resource is met, the UE does not wait for completion of backoff time to perform the random access resource selection (i.e. select the random access preamble and RACH occasion) and transmits the random access preamble.

The UE may check for criteria to select contention-free random access resources periodically during the backoff time or whenever new measurements of SSBs/CSI RSs are available if contention free random access resources for ongoing RA is associated with SSBs/CSI RSs or once at the time of starting the backoff if RA procedure is initiated by PDCCH order and PDCCH order includes ra-preamble index not equal to zero.

Herein, the criteria to select contention-free random access resources is explained in detail.

If the contention free random access resources associated with SSBs and/or CSI RSs is signaled to the UE for the ongoing RA procedure (other than beam failure recovery) and signal quality (i.e. reference signal received power (RSRP)) of at least one of the associated SSBs or CSI RSs is above a threshold (signaled by the gNB), then criteria to select contention-free random access resources is considered to be met.

If this RA procedure is initiated by PDCCH order and PDCCH order includes ra-preamble index not equal to zero, then criteria to select contention-free random access resources is also considered to be met.

If the RA procedure is initiated for beam failure recovery and beam failure recovery timer is either running or not configured and if the contention free random access resources associated with SSBs and/or CSI RSs is signaled to the UE for the ongoing RA procedure and signal quality (i.e. reference signal received power (RSRP)) of at least one of the associated SSBs or CSI RSs is above a threshold (signaled by the gNB), then criteria to select contention-free random access resources is also considered to be met.

If the backoff timer expires, the UE performs the random access resource selection (i.e. select the random access preamble and RACH occasion) and transmits the random access preamble.

Embodiment 1-1

Random Access Response Reception Procedure

Once the random access preamble is transmitted and regardless of the possible occurrence of a measurement gap, the MAC entity shall:
1> if the contention-free random access preamble for beam failure recovery request was transmitted by the MAC entity:
  2> start the ra-ResponseWindow configured in BeamFailureRecoveryConfig at the first PDCCH occasion as specified in TS 38.213 [6] from the end of the random access preamble transmission;
  2> monitor the PDCCH of the SpCell for response to beam failure recovery request identified by the C-RNTI while ra-ResponseWindow is running.
1> else:
  2> start the ra-ResponseWindow configured in RACH-ConfigCommon at the first PDCCH occasion as specified in TS 38.213 [6] from the end of the random access preamble transmission;
  2> monitor the PDCCH of the SpCell for random access response(s) identified by the RA-RNTI while the ra-ResponseWindow is running.
1> if notification of a reception of a PDCCH transmission is received from lower layers; and
1> if PDCCH transmission is addressed to the C-RNTI; and
1> if the contention-free random access preamble for beam failure recovery request was transmitted by the MAC entity:
  2> consider the random access procedure successfully completed.
1> else if a downlink assignment has been received on the PDCCH for the RA-RNTI and the received TB is successfully decoded:
  2> if the random access response contains a MAC subPDU with backoff indicator:
    3> set the PREAMBLE_BACKOFF to value of the BI field of the MAC subPDU using Table 7.2-1 of TS 38.321.
  2> else:
    3> set the PREAMBLE_BACKOFF to 0 ms.
  2> if the random access response contains a MAC subPDU with random access preamble identifier corresponding to the transmitted PREAMBLE INDEX (see subclause 5.1.3):
    3> consider this random access response reception successful.
  2> if the random access response reception is considered successful:
    3> if the random access response includes a MAC subPDU with RAPID only:
      4> consider this random access procedure successfully completed;
      4> indicate the reception of an acknowledgement for the SI request to upper layers.
    3> else:
      4> apply the following actions for the serving cell where the random access preamble was transmitted:
        5> process the received timing advance command (see subclause 5.2 of TS 38.321);
        5> indicate the preambleReceivedTargetPower and the amount of power ramping applied to the latest random access preamble transmission to lower layers (i.e. (PREAMBLE_POWER_RAMPING_COUNTER−1)×powerRampingStep);
        5> if the serving cell for the random access procedure is SRS-only SCell:
          6> ignore the received UL grant.
        5> else:
          6> process the received UL grant value and indicate it to the lower layers.
      4> if the random access preamble was not selected by the MAC entity among the contention-based random access preamble(s):
        5> consider the random access procedure successfully completed.
      4> else:
        5> set the TEMPORARY_C-RNTI to the value received in the random access response;
        5> if this is the first successfully received random access response within this random access procedure:
          6> if the transmission is not being made for the CCCH logical channel:
            7> indicate to the multiplexing and assembly entity to include a C-RNTI MAC CE in the subsequent uplink transmission.
          6> obtain the MAC PDU to transmit from the multiplexing and assembly entity and store it in the Msg3 buffer.
1> if ra-ResponseWindow configured in RACH-ConfigCommon expires, and if the random access response containing random access preamble identifiers that matches the transmitted PREAMBLE INDEX has not been received; or:
1> if ra-ResponseWindow configured in BeamFailureRecoveryConfig expires and if the PDCCH addressed to the C-RNTI has not been received:
  2> consider the random access response reception not successful;
  2> increment PREAMBLE_TRANSMISSION_COUNTER by 1;
  2> if PREAMBLE_TRANSMISSION_COUNTER preambleTransMax+1:
    3> if the random access preamble is transmitted on the SpCell:
      4> indicate a random access problem to upper layers;
      4> if the random access procedure was triggered for SI request:
        5> consider the random access procedure unsuccessfully completed.
    3> else if the random access preamble is transmitted on a SCell:
      4> consider the random access procedure unsuccessfully completed.
  2> if the random access procedure is not completed:
    3> select a random backoff time according to a uniform distribution between 0 and the PREAMBLE_BACKOFF;
    3> start backoff timer.
    3> if criteria (as defined in subclause 5.1.2 of TS 38.321) to select contention-free random access resources is met while the backoff timer is running (or in other words during the backoff time):
    4> stop the backoff timer;
    4> perform the random access resource selection procedure (see subclause 5.1.2 of TS 38.321).
  3> if backoff timer expires (or in other words after the backoff time), perform the random access resource selection procedure (see subclause 5.1.2 of TS 38.321).

Contention Resolution Procedure

Contention resolution is based on either C-RNTI on PDCCH of the SpCell or UE contention resolution identity on DL-SCH.

Once Msg3 is transmitted, the MAC entity shall:
1> start the ra-ContentionResolutionTimer and restart the ra-ContentionResolutionTimer at each HARQ retransmission;
1> monitor the PDCCH while the ra-ContentionResolutionTimer is running regardless of the possible occurrence of a measurement gap;
1> if notification of a reception of a PDCCH transmission is received from lower layers:
  2> if the C-RNTI MAC CE was included in Msg3:
    3> if the random access procedure was initiated by the MAC sublayer itself or by the RRC sublayer and the PDCCH transmission is addressed to the C-RNTI and contains a UL grant for a new transmission; or
    3> if the random access procedure was initiated by a PDCCH order and the PDCCH transmission is addressed to the C-RNTI; or
    3> if the random access procedure was initiated for beam failure recovery (as specified in subclause 5.17 of TS 38.321) and the PDCCH transmission is addressed to the C-RNTI:
      4> consider this contention resolution successful;
      4> stop ra-ContentionResolutionTimer;
      4> discard the TEMPORARY_C-RNTI;
      4> consider this random access procedure successfully completed.
  2> else if the CCCH SDU was included in Msg3 and the PDCCH transmission is addressed to its TEMPORARY_C-RNTI:
    3> if the MAC PDU is successfully decoded:
      4> stop ra-ContentionResolutionTimer;
      4> if the MAC PDU contains a UE contention resolution identity MAC CE; and
      4> if the UE contention resolution identity in the MAC CE matches the CCCH SDU transmitted in Msg3:
        5> consider this contention resolution successful and finish the disassembly and demultiplexing of the MAC PDU;
        5> if this random access procedure was initiated for SI request:
          6> indicate the reception of an acknowledgement for SI request to upper layers.
        5> else:
          6> set the C-RNTI to the value of the TEMPORARY_C-RNTI;
        5> discard the TEMPORARY_C-RNTI;
        5> consider this random access procedure successfully completed.
      4> else
        5> discard the TEMPORARY_C-RNTI;
        5> consider this contention resolution not successful and discard the successfully decoded MAC PDU.

1> if ra-ContentionResolutionTimer expires:
  2> discard the TEMPORARY_C-RNTI;
  2> consider the contention resolution not successful.
1> if the contention resolution is considered not successful:
  2> flush the HARQ buffer used for transmission of the MAC PDU in the Msg3 buffer;
  2> increment PREAMBLE_TRANSMISSION_ COUNTER by 1;
  2> if PREAMBLE_TRANSMISSION_COUNTER preambleTransMax+1:
    3> indicate a random access problem to upper layers.
    3> if this random access procedure was triggered for SI request:
      4> consider the random access procedure unsuccessfully completed.
  2> if the random access procedure is not completed:
    3> select a random backoff time according to a uniform distribution between 0 and the PREAMBLE_BACKOFF;
    3> start backoff timer;
    3> if the contention-free random access resources are explicitly provided by RRC and criteria (as defined in subclause 5.1.2 of TS 38.321) to select contention-free random access resources is met while the backoff timer is running (or that is, during the backoff time):
      4> stop the backoff timer;
      4> perform the random access resource selection procedure (see subclause 5.1.2 of TS 38.321).
    3> if backoff timer expires (or that is, after the backoff time), perform the random access resource selection procedure (see subclause 5.1.2 of TS 38.321).

Embodiment 2

Figure 4:
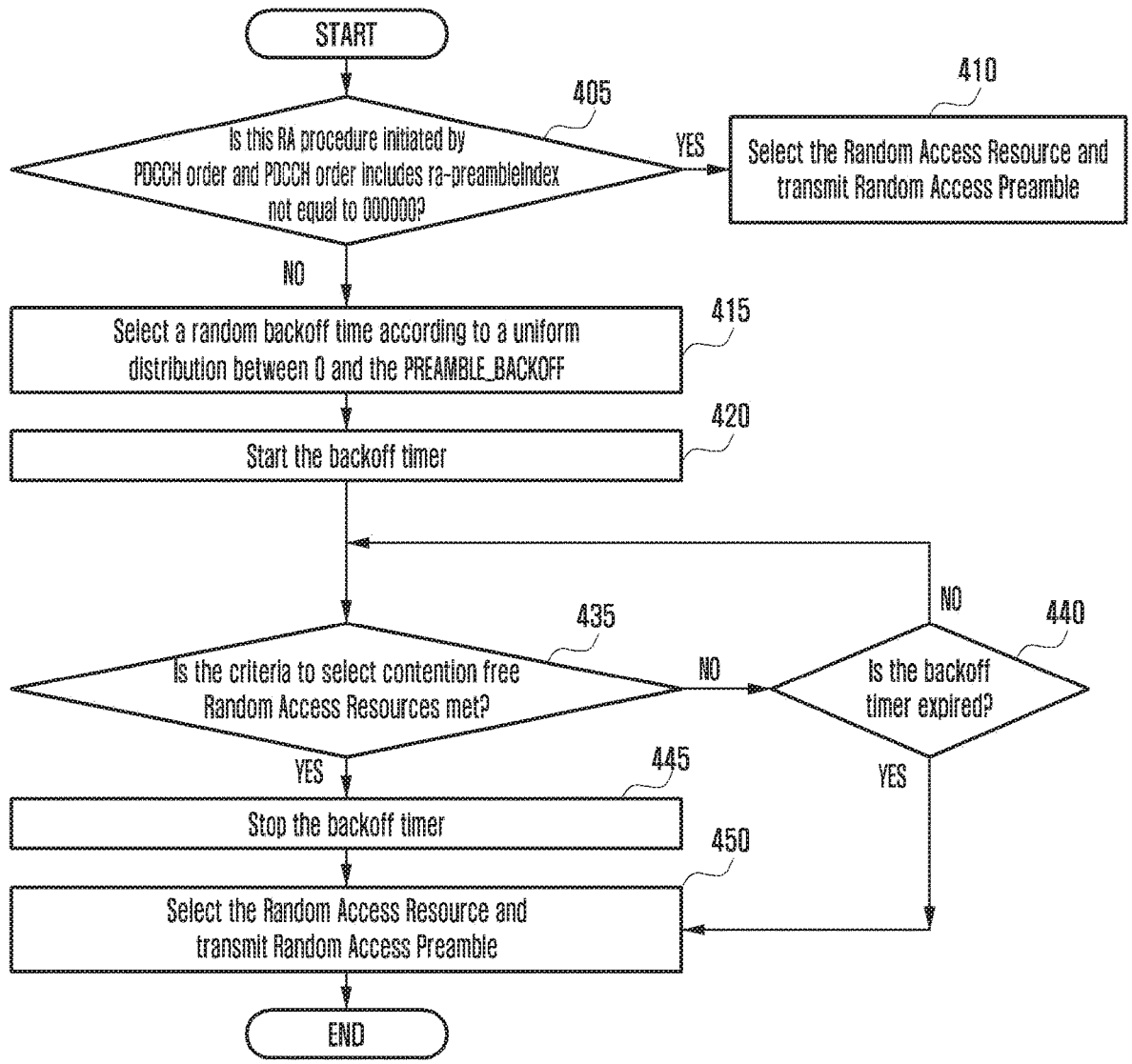
FIG. 4 is another flowchart of an operation for a random access backoff during a random access procedure according to an embodiment of the disclosure.

FIG. 4 is another flowchart of an operation for a random access backoff during a random access procedure according to an embodiment of the disclosure.

Referring to FIG. 4, a UE performs this operation if an RAR corresponding to its random access preamble transmission is not received during the RAR window and the UE has not yet transmitted the random access preamble for a configurable number of times (preambleTransMax configured by a gNB via RRC signaling) during the RA procedure. In an embodiment, the UE also performs this operation if a contention resolution timer expires during the RA procedure and the UE has not yet transmitted the random access preamble for a configurable number of times (preambleTransMax configured by the gNB via RRC signaling) during the RA procedure. In an embodiment, the UE also performs this operation if the RAR corresponding to its random access preamble transmission is not received during the RAR window and a backoff indicator is received in the RAR and the UE has not yet transmitted the random access preamble for a configurable number of times (preambleTransMax configured by the gNB via RRC signaling) during the RA procedure. In an embodiment, the UE also performs this operation if the contention resolution timer expires during the RA procedure and the backoff indicator is received in the RAR and the UE has not yet transmitted the random access preamble for a configurable number of times (preambleTransMax configured by the gNB via RRC signaling) during the RA procedure. In an embodiment, in a 2 step RACH procedure, the UE also performs this operation if a network response indicating either to transmit an Msg3 or indicating successful reception of an MsgA transmitted by the UE, is not received during the response window and the backoff indicator is received in a network response and the UE has not yet transmitted the random access preamble for a configurable number of times (preambleTransMax configured by the gNB via RRC signaling) during the RA procedure.

If this RA procedure is initiated at operation 405 by PDCCH order and the PDCCH order includes ra-preambleIndex not equal to 000000, the operation proceeds to operation 410. Otherwise, the operation proceeds to operation 415.

At operation 415, a random backoff time is selected according to a uniform distribution between 0 and the PREAMBLE_BACKOFF. The PREAMBLE_BACKOFF is set to backoff value or to a scaling factor*backoff value if a scaling factor is configured by a gNB for ongoing random access procedure. The backoff value is obtained by the UE from a backoff table corresponding to a backoff index received in RAR MAC PDU.

At operation 420, a backoff timer is started for a determined backoff time.

If the criteria to select contention-free random access resources is met while the backoff timer is running at operation 435), the backoff timer is stopped at operation 445.

Herein, criteria to select contention-free random access resources is explained in detail.

If the contention free random access resources associated with SSBs and/or CSI RSs is signaled to UE for the ongoing RA procedure (other than beam failure recovery) and signal quality (i.e. RSRP) of at least one of the associated SSBs or CSI RSs is above a threshold (signaled by the gNB), then criteria to select contention-free random access resources is considered to be met.

If the RA procedure is initiated for beam failure recovery and beam failure recovery timer is either running or not configured and if the contention free random access resources associated with SSBs and/or CSI RSs is signaled to the UE for the ongoing RA procedure and signal quality (i.e. reference signal received power (RSRP)) of at least one of the associated SSBs or CSI RSs is above a threshold (signaled by the gNB), then criteria to select contention-free random access resources is also considered to be met.

At operation 450, the random access resource selection (i.e. select the random access preamble and RACH occasion) is performed and the random access preamble is transmitted.

If the backoff timer expires, the UE performs the random access resource selection (i.e. select the random access preamble and RACH occasion) and transmits the random access preamble at operation 440.

Embodiment 3

Figure 5:
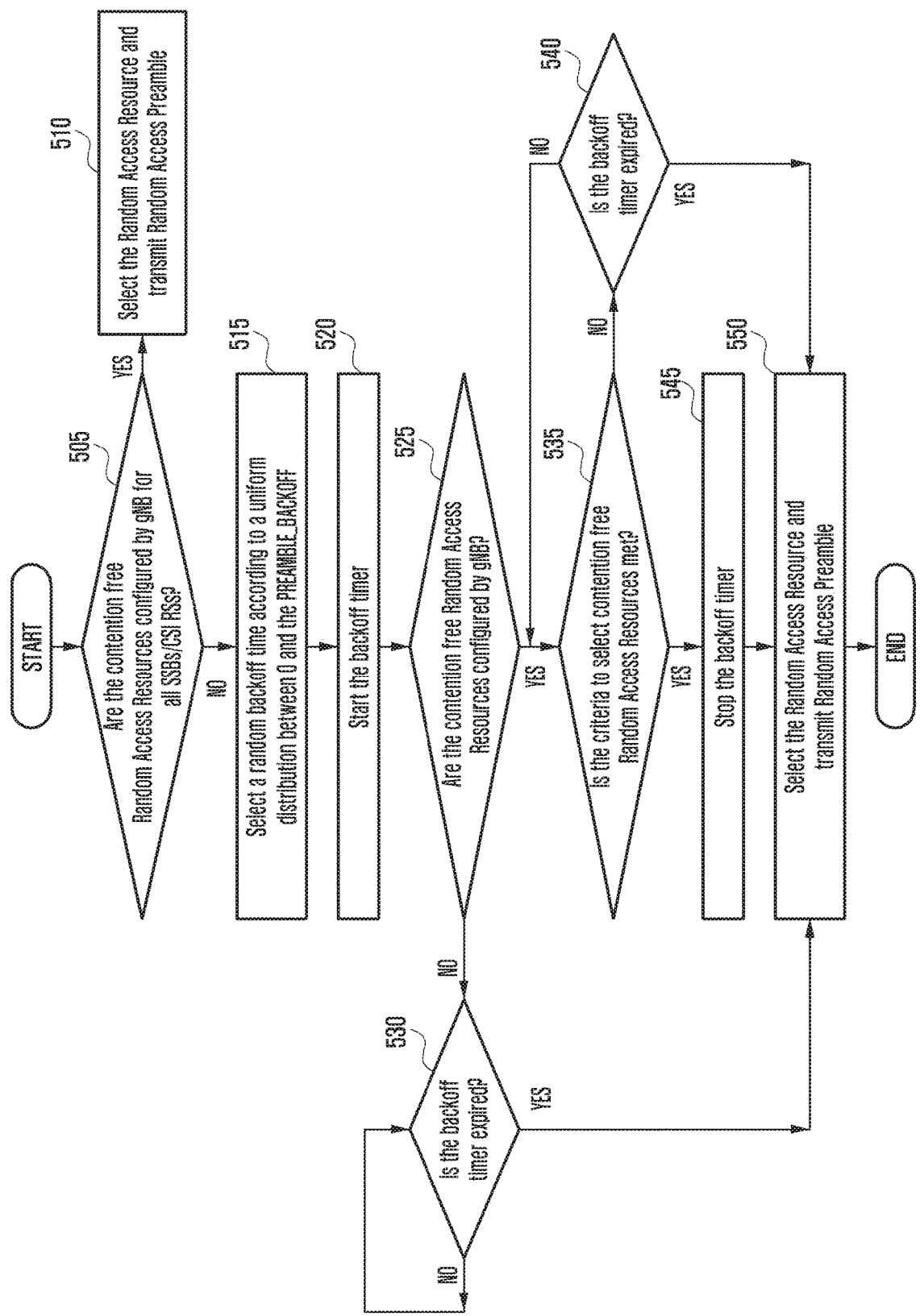
FIG. 5 is another flowchart of an operation for a random access backoff during a random access procedure according to an embodiment of the disclosure.

FIG. 5 is another flow chart of an operation for a random access backoff during a random access procedure according to an embodiment of the disclosure.

Referring to FIG. 5, a UE performs this operation if an RAR corresponding to its random access preamble transmission is not received during the RAR window and the UE has not yet transmitted the random access preamble for a configurable number of times (preambleTransMax configured by a gNB via RRC signaling) during the RA procedure. In an embodiment, the UE also performs this operation if a contention resolution timer expires during the RA procedure and the UE has not yet transmitted the random access preamble for a configurable number of times (preambleTransMax configured by the gNB via RRC signaling) during the RA procedure. In an embodiment, the UE also performs this operation if the RAR corresponding to its random access preamble transmission is not received during the RAR window and a backoff indicator is received in the RAR and the UE has not yet transmitted the random access preamble for a configurable number of times (preambleTransMax configured by the gNB via RRC signaling) during the RA procedure. In an embodiment, the UE also performs this operation if the contention resolution timer expires during the RA procedure and the backoff indicator is received in the RAR and the UE has not yet transmitted the random access preamble for a configurable number of times (preambleTransMax configured by the gNB via RRC signaling) during the RA procedure. In an embodiment, in a 2 step RACH procedure, the UE also performs this operation if a network response indicating either to transmit an Msg3 or indicating successful reception of an MsgA transmitted by the UE, is not received during the response window and the backoff indicator is received in a network response and the UE has not yet transmitted the random access preamble for a configurable number of times (preambleTransMax configured by the gNB via RRC signaling) during the RA procedure.

If for this RA procedure at operation 505, a gNB has configured contention free random access resources for all SSBs and/or CSI RSs, the operation proceeds to operation 510. Otherwise, the operation proceeds to operation 515.

At operation 515, a random backoff time is selected according to a uniform distribution between 0 and the PREAMBLE_BACKOFF. The PREAMBLE_BACKOFF is set to backoff value or to a scaling factor*backoff value if a scaling factor is configured by the gNB for ongoing random access procedure. The backoff value is obtained by the UE from a backoff table corresponding to a backoff index received in RAR MAC PDU.

At operation 520, a backoff timer is started for a determined backoff time.

If the contention-free random access resources are signaled by the gNB for the ongoing random access procedure at operation 525 and criteria to select contention-free random access resources is met while the backoff timer is running at operation 535, the backoff timer is stopped at operation 545.

If the contention free random access resources are not configured by the gNB, the UE selects a random access resource and transmits a random access preamble to a base station (gNB) when the backoff timer is expired at operation 530.

Herein, criteria to select contention-free random access resources is explained in detail.

If the contention free random access resources associated with SSBs and/or CSI RSs is signaled to the UE for the ongoing RA procedure (other than beam failure recovery) and signal quality (i.e. RSRP) of at least one of the associated SSBs or CSI RSs is above a threshold (signaled by the gNB), then criteria to select contention-free random access resources is considered to be met.

If this RA procedure is initiated by PDCCH order and the PDCCH order includes ra-preamble index not equal to zero, then criteria to select contention-free random access resources is also considered to be met.

If the RA procedure is initiated for beam failure recovery and beam failure recovery timer is either running or not configured and if the contention free random access resources associated with SSBs and/or CSI RSs is signaled to the UE for the ongoing RA procedure and signal quality (i.e. reference signal received power (RSRP)) of at least one of the associated SSBs or CSI RSs is above a threshold (signaled by the gNB), then criteria to select contention-free random access resources is also considered to be met.

At operation 550, the random access resource selection (i.e. select the random access preamble and RACH occasion) is performed and the random access preamble is transmitted.

If the backoff timer expires at operation 540, the UE performs the random access resource selection (i.e. selects the random access preamble and RACH occasion) and transmits the random access preamble.

Embodiment 4

Figure 6:
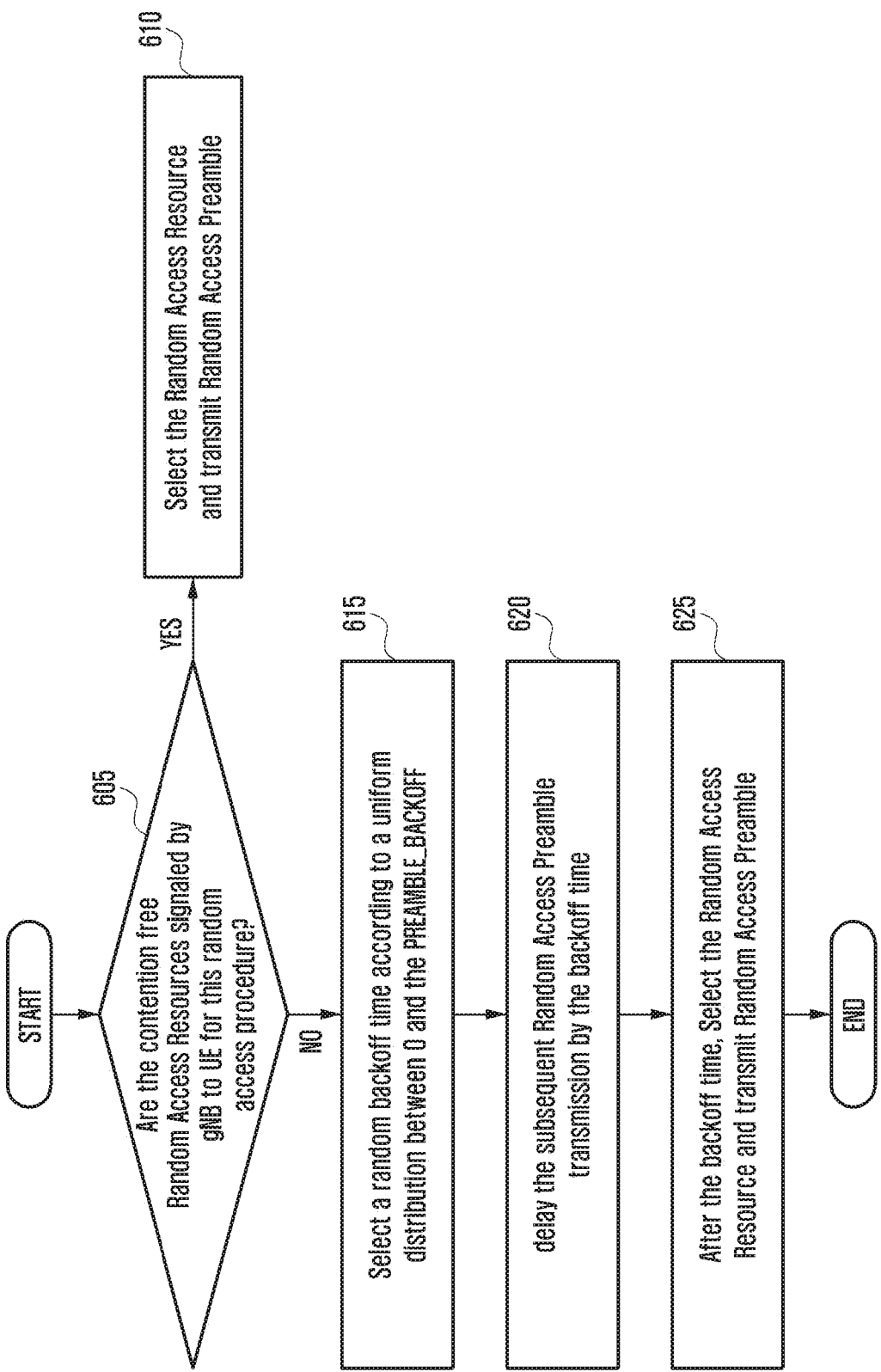
FIG. 6 is another flowchart of an operation for a random access backoff during a random access procedure according to an embodiment of the disclosure.

FIG. 6 is another flowchart of an operation for a random access backoff during a random access procedure according to an embodiment of the disclosure.

Referring to FIG. 6, a UE performs this operation if an RAR corresponding to its random access preamble transmission is not received during the RAR window and the UE has not yet transmitted the random access preamble for a configurable number of times (preambleTransMax configured by a gNB via RRC signaling) during the RA procedure. In an embodiment, in a 2 step RACH procedure, the UE performs this operation if a network response indicating either to transmit an Msg3 or indicating successful reception of an MsgA transmitted by the UE, is not received during the response window and a backoff indicator is received in the network response and the UE has not yet transmitted the random access preamble for a configurable number of times (preambleTransMax configured by the gNB via RRC signaling) during the RA procedure.

If for this RA procedure at operation 605, contention free random access resources are explicitly signaled by RRC or PDCCH order, the operation proceeds to operation 610. Otherwise, the operation proceeds to operation 615.

At operation 615, a random backoff time is selected according to a uniform distribution between 0 and the PREAMBLE_BACKOFF. The PREAMBLE_BACKOFF is set to backoff value or to a scaling factor*backoff value if a scaling factor is configured by the gNB for ongoing random access procedure. The backoff value is obtained by the UE from a backoff table corresponding to a backoff index received in RAR MAC PDU.

At operation 620, the subsequent random access preamble transmission is delayed by a backoff time.

At operation 625, the random access resource selection (i.e. select the random access preamble and RACH occasion) is performed and the random access preamble is transmitted.

Embodiment 5

Figure 7:
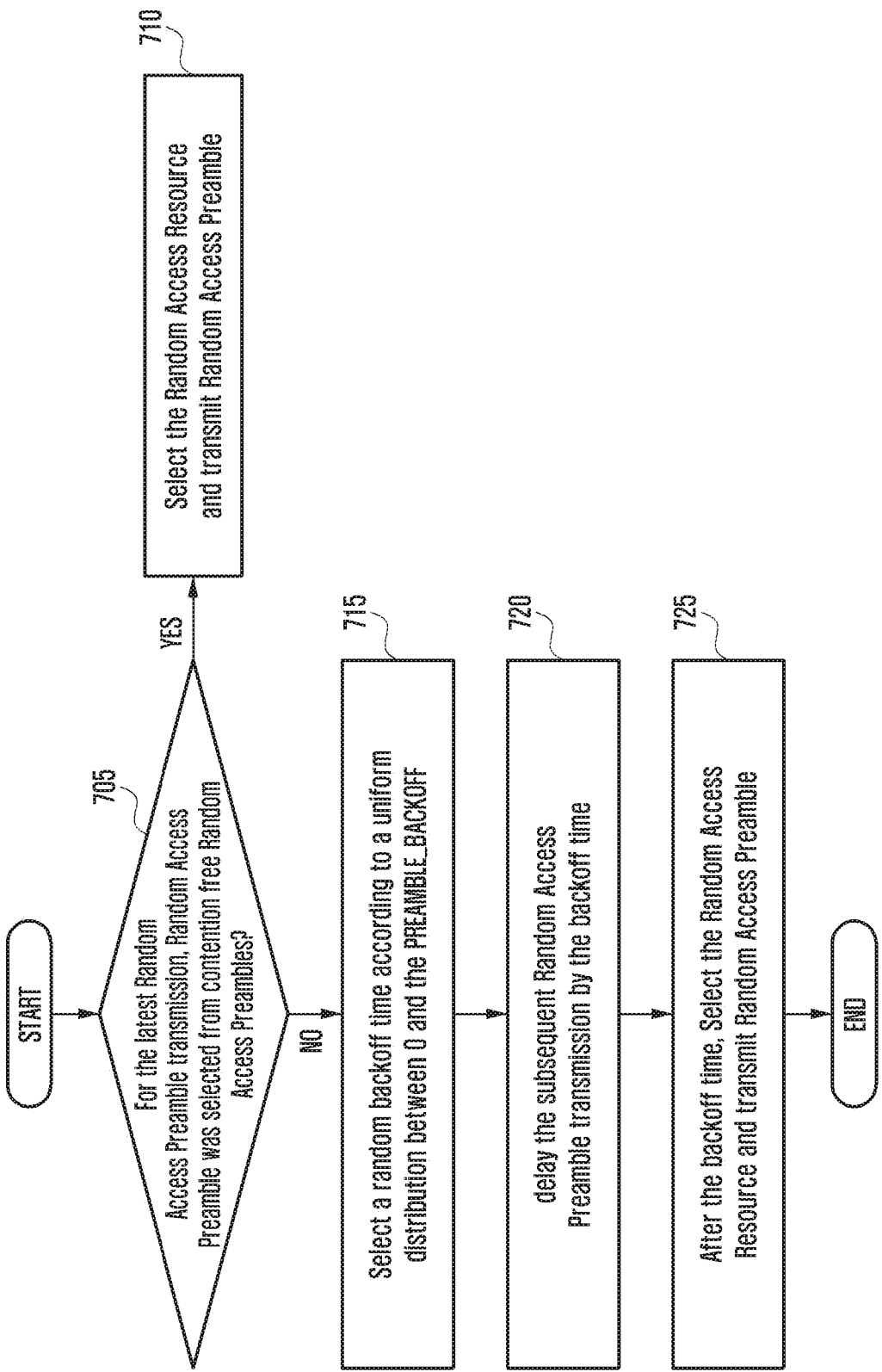
FIG. 7 is another flowchart of an operation for a random access backoff during a random access procedure according to an embodiment of the disclosure.

FIG. 7 is another flow chart of an operation for a random access backoff during a random access procedure according to an embodiment of the disclosure.

Referring to FIG. 7, a UE performs this operation if an RAR corresponding to its random access preamble transmission is not received during the RAR window and the UE has not yet transmitted the random access preamble for a configurable number of times (preambleTransMax configured by a gNB via RRC signaling) during the RA procedure. In an embodiment, in a 2 step RACH procedure, the UE also performs this operation if a network response indicating either to transmit an Msg3 or indicating successful reception of an MsgA transmitted by the UE, is not received during the response window and a backoff indicator is received in the network response and the UE has not yet transmitted the random access preamble for a configurable number of times (preambleTransMax configured by the gNB via RRC signaling) during the RA procedure.

If, for the latest preamble transmission at operation 705, the random access preamble was not selected among the contention-based random access preambles, the operation proceeds to operation 710. Otherwise, if for the latest preamble transmission, the random access preamble was selected among the contention-based random access preambles, the operation proceeds to operation 715.

At operation 715, a random backoff time is selected according to a uniform distribution between 0 and the PREAMBLE_BACKOFF. The PREAMBLE_BACKOFF is set to backoff value or to a scaling factor*backoff value if a scaling factor is configured by the gNB for ongoing random access procedure. The backoff value is obtained by the UE from a backoff table corresponding to a backoff index received in RAR MAC PDU.

At operation 720, the subsequent random access preamble transmission is delayed by a backoff time.

At operation 725, the random access resource selection (i.e. select the random access preamble and RACH occasion) is performed and the random access preamble is transmitted.

Embodiment 6

Figure 8:
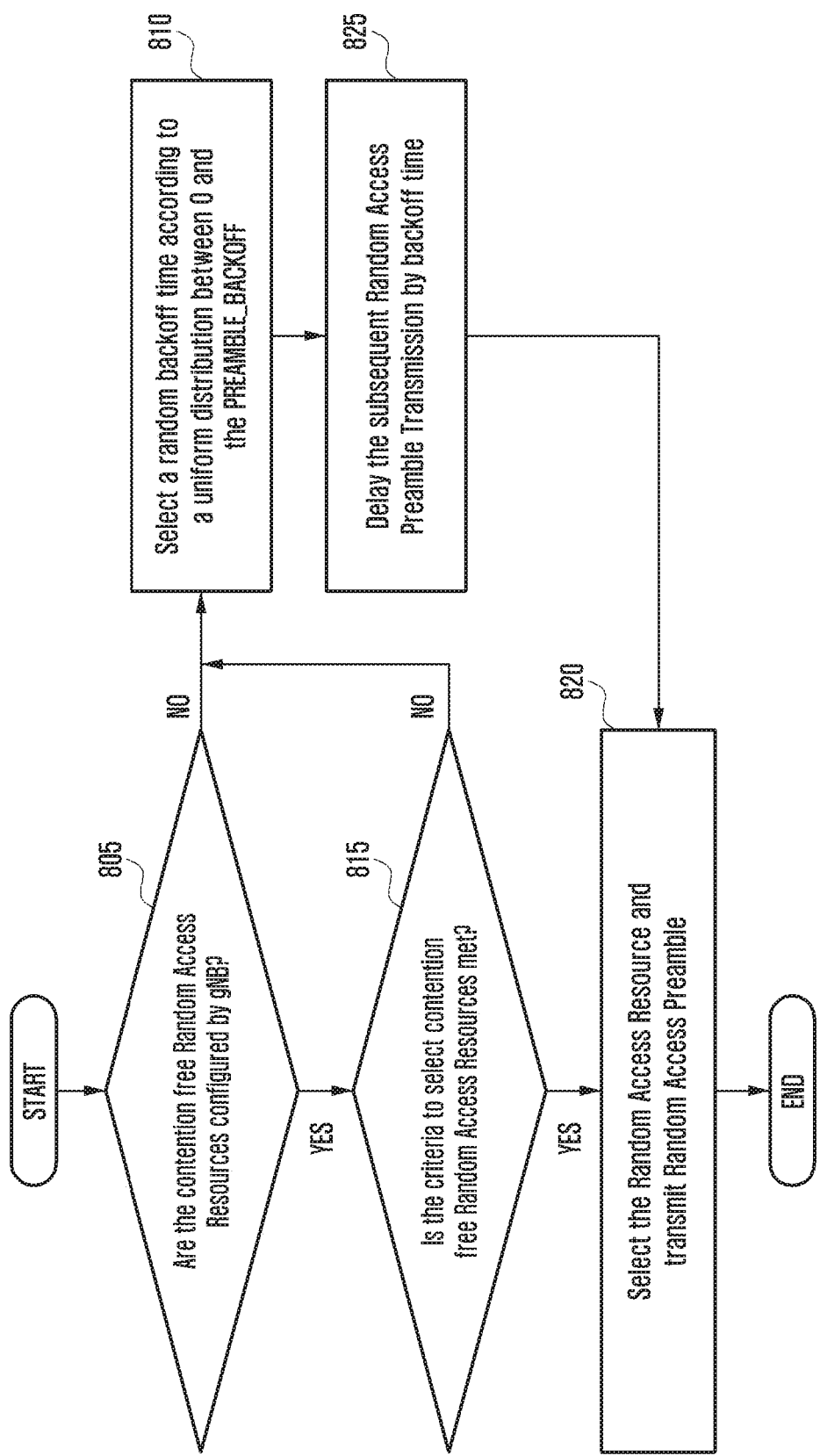
FIG. 8 is another flowchart of an operation for a random access backoff during a random access procedure according to an embodiment of the disclosure.

FIG. 8 is another flowchart of an operation for a random access backoff during a random access procedure according to an embodiment of the disclosure.

Referring to FIG. 8, a UE performs this operation if an RAR corresponding to its random access preamble transmission is not received during the RAR window and the UE has not yet transmitted the random access preamble for a configurable number of times (preambleTransMax configured by a gNB via RRC signaling) during the RA procedure. In an embodiment, the UE also performs this operation if a contention resolution timer expires during the RA procedure and the UE has not yet transmitted the random access preamble for a configurable number of times (preambleTransMax configured by the gNB via RRC signaling) during the RA procedure. In an embodiment, the UE also performs this operation if the RAR corresponding to its Random Access Preamble transmission is not received during the RAR window and a backoff indicator is received in the RAR and the UE has not yet transmitted the random access preamble for a configurable number of times (preambleTransMax configured by the gNB via RRC signaling) during the RA procedure. In an embodiment, the UE also performs this operation if the contention resolution timer expires during the RA procedure and the backoff indicator is received in the RAR and the UE has not yet transmitted the random access preamble for a configurable number of times (preambleTransMax configured by the gNB via RRC signaling) during the RA procedure. In an embodiment, in a 2 step RACH procedure, the UE also performs this operation if a network response indicating either to transmit an Msg3 or indicating successful reception of an MsgA transmitted by the UE, is not received during the response window and the backoff indicator is received in the network response and the UE has not yet transmitted the random access preamble for a configurable number of times (preambleTransMax configured by the gNB via RRC signaling) during the RA procedure.

If for this RA procedure at operation 805, contention free random access resources are configured (i.e. explicitly signaled by RRC or PDCCH order) and criteria to select contention free random access resources is met, the operation proceeds operation 815. Otherwise, the operation proceeds to operation 810.

At operation 810, a random backoff time is selected according to a uniform distribution between 0 and the PREAMBLE_BACKOFF. The PREAMBLE_BACKOFF is set to backoff value or to a scaling factor*backoff value if a scaling factor is configured by the gNB for ongoing random access procedure. The backoff value is obtained by the UE from a backoff table corresponding to a backoff index received in RAR MAC PDU.

At operation 825, the subsequent random access preamble transmission is delayed by a backoff time.

At operation 820, the random access resource selection (i.e. select the random access preamble and RACH occasion) is performed and the random access preamble is transmitted.

Embodiment 7

Hereinafter, embodiments of SI Window Determination for SI message reception are explained.

Figure 9:
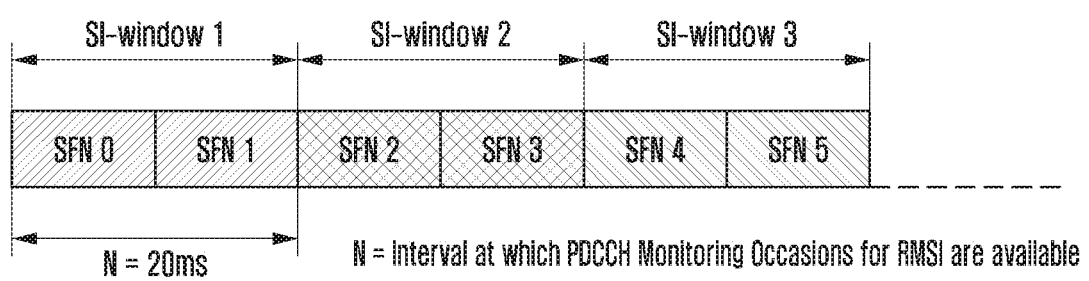
FIG. 9 illustrates a system information window according to an embodiment of the disclosure.
Figure 10:
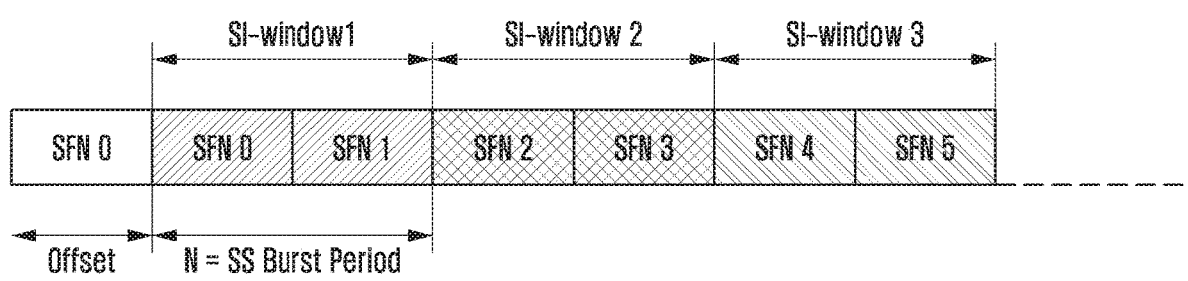
FIG. 10 illustrates another system information window according to an embodiment of the disclosure.

FIG. 9 illustrates a system information window according to an embodiment of the disclosure. FIG. 10 illustrates another system information window according to an embodiment of the disclosure.

FIG. 9 and FIG. 10 are example illustrations of SI-windows for a default association. Default association (i.e. PDCCH monitoring occasions for OSI are the same as those configured for remaining system information (RMSI)) is used when osi-SearchSpace is not signaled by a gNB. The number of slots in a radio frame are assumed to be 10 in the examples.

Referring to FIG. 9, FIG. 9 is an example for pattern 1 where the set of PDCCH monitoring occasions for RMSI are located at every 20 ms starting from system frame number (SFN) 0. In this case, a network will configure a si-WindowLength of 20 slots (i.e. equal to N). During the SI window, the UE only monitors the slots/symbols corresponding to the PDCCH monitoring occasions for SI messages.

Referring to FIG. 10, FIG. 10 is an example for pattern 2/3 where the set of PDCCH monitoring occasions for RMSI are located every synchronization signal (SS) burst set period. The SS burst set period can start from SFN 0 or at an offset from SFN 0. In the example, the SS burst set period is 20 ms and offset is 1 radio frame. In this case, a network will configure a si-WindowLength of 20 slots and offset equal to one radio frame. During the SI window, the UE only monitors the slots/symbols corresponding to the PDCCH monitoring occasions for SI messages.

For default association:
"Pattern 1" refers to a multiplexing pattern that SS/PBCH block and RMSI control resource set (CORESET) occur in different time instances, and SS/PBCH block TX BandWidth (BW) and the initial active DL BandWidth Part (BWP) containing RMSI CORESET overlap;
"Pattern 2" refers to a multiplexing pattern that SS/PBCH block and RMSI CORESET occur in different time instances, and SS/PBCH block TX BW and the initial active DL BWP containing RMSI CORESET do not overlap; and
"Pattern 3" refers to a multiplexing pattern that SS/PBCH block and RMSI CORESET occur in the same time instance, and SS/PBCH block TX BW and the initial active DL BWP containing RMSI CORESET do not overlap.

The pattern used for default association is configured using parameter PDCCHConfigSIB1 signaled in MIB.

Figure 11:
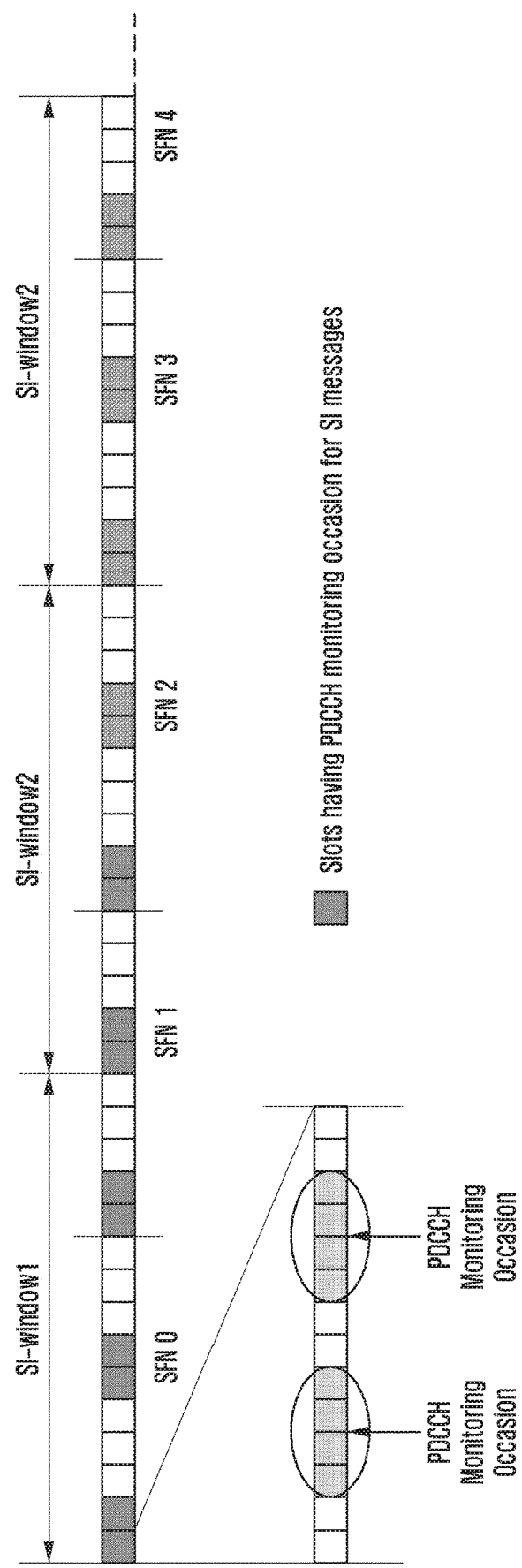
FIG. 11 illustrates another system information window according to an embodiment of the disclosure.

FIG. 11 illustrates another system information window according to an embodiment of the disclosure.

Referring to FIG. 11, FIG. 11 is an example illustration of SI-windows for the non-default association. In the example, osi-SearchSpace configuration is as follows: Periodicity: 5 slots; Offset: 0; duration: 2 slots; monitoringSymbolsWithinSlot: 00100000100000; and CORESET-time-duration: 4 OFDM symbols. The number of slots in a radio frame is assumed to be 10 in the example. The number of SSBs is 12. In this case, a network will configure a si-WindowLength of 15 slots so that there is PDCCH monitoring occasion for each SSB.

A UE receives the SystemInformationBlockType1 from a gNB. The SystemInformationBlockType1 includes schedulingInfoList, si-WindowLength, Offset and si-Periodicity. The si-Periodicity is signaled independently for each SI message in schedulingInfoList. All of these parameters are applicable for any DL BWP (of cell) in which a UE receives an SI message. The UE procedure for determining the start of an SI-window for the concerned SI message is as follows:
for the concerned SI message, determine the number n which corresponds to the order of entry in the list of SI messages configured by schedulingInfoList in SystemInformationBlockType1;
determine the integer value x=Offset+(n−1)*w, where w is the si-WindowLength in slots. In an embodiment, offset is not configured and the UE determines the integer value x=(n−1)*w, where w is the si-WindowLength;
the SI-window starts at the slot # a, where a=x mod (number of slots in a radio frame), in the radio frame for which SFN mod T=FLOOR (x/number of slots in a radio frame), where T is the si-Periodicity of the concerned SI message. The number of slots in a radio frame depends on the SCS for OSI. The SCS for OSI is the SCS of DL BWP in which the UE receives the SI message. Mapping between slots in a radio frame and various SCSs is pre-defined; and
during the SI window, the UE only monitors the slots/symbols corresponding to the PDCCH monitoring occasions for SI messages. The PDCCH monitoring occasions for SI messages are determined according to configuration indicated by osi-SearchSpace if osi-SearchSpace is not zero and according to the default association (i.e. PDCCH monitoring occasions for paging are same as for RMSI) otherwise. The osi-SearchSpace is the search space id of search space configuration which the UE shall use for SI message reception.

Figure 12:
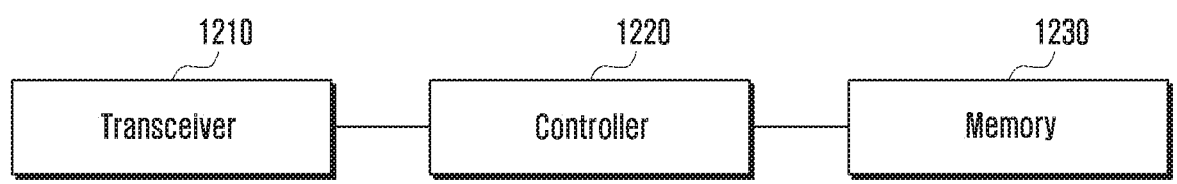
FIG. 12 is a block diagram of a terminal according to an embodiment of the disclosure.

FIG. 12 is a block diagram of a terminal according to an embodiment of the disclosure.

Referring to FIG. 12, a terminal includes a transceiver 1210, a controller 1220 and a memory 1230. The transceiver 1210, the controller 1220 and the memory 1230 are configured to perform the operations of the UE illustrated in the figures, e.g. FIGS. 1 to 11, or otherwise described above. Although the transceiver 1210, the controller 1220 and the memory 1230 are shown as separate entities, they may be realized as a single entity like a single chip. The transceiver 1210, the controller 1220 and the memory 1230 may be electrically connected to or coupled with each other.

The transceiver 1210 may transmit and receive signals to and from other network entities, e.g., a base station.

The controller 1220 may control the UE to perform functions according to one or more of the embodiments described above. The controller 1220 may refer to a circuitry, an application-specific integrated circuit (ASIC), or at least one processor, but embodiments are not limited thereto.

In an embodiment, the operations of the terminal may be implemented using the memory 1230 storing corresponding program codes. Specifically, the terminal may be equipped with the memory 1230 to store program codes implementing desired operations. To perform the desired operations, the controller 1220 may read and execute the program codes stored in the memory 1230 by using a processor or a central processing unit (CPU).

Figure 13:
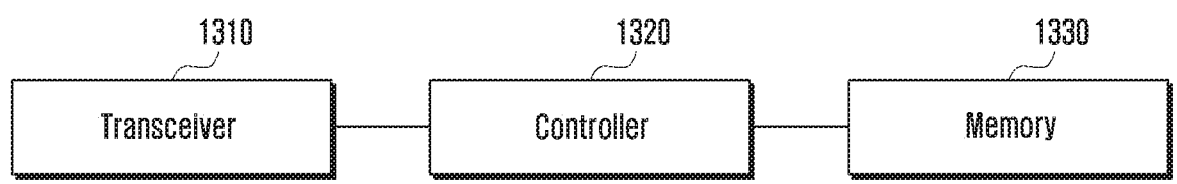
FIG. 13 is a block diagram of a base station according to an embodiment of the disclosure.

FIG. 13 is a block diagram of a base station according to an embodiment of the disclosure.

Referring to FIG. 13, a base station includes a transceiver 1310, a controller 1320 and a memory 1330. The transceiver 1310, the controller 1320 and the memory 1330 are configured to perform the operations of the network (e.g., gNB) illustrated in the figures, e.g. FIGS. 1 to 11, or otherwise described above. Although the transceiver 1310, the controller 1320 and the memory 1330 are shown as separate entities, they may be realized as a single entity like a single chip. The transceiver 1310, the controller 1320 and the memory 1330 may be electrically connected to or coupled with each other.

The transceiver 1310 may transmit and receive signals to and from other network entities, e.g., a terminal.

The controller 1320 may control the base station to perform functions according to one of the embodiments described above. The controller 1320 may refer to a circuitry, an ASIC, or at least one processor, but embodiments are not limited thereto.

In an embodiment, the operations of the base station may be implemented using the memory 1330 storing corresponding program codes. Specifically, the base station may be equipped with the memory 1330 to store program codes implementing desired operations. To perform the desired operations, the controller 1320 may read and execute the program codes stored in the memory 1330 by using a processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

As described above, embodiments disclosed in the specification and drawings are merely used to present specific examples to easily explain the contents of the disclosure and to help understanding, but are not intended to limit the scope of the disclosure. Accordingly, the scope of the disclosure should be analyzed to include all changes or modifications derived based on the technical concept of the disclosure in addition to the embodiments disclosed herein.

What is claimed is:

1. A method performed by a terminal in a wireless communication system, the method comprising:
    selecting a backoff time associated with a random access procedure;
    identifying whether a criteria to select a contention free random access resource is met during the backoff time, wherein the criteria is identified to be met in case that at least one contention free random access resource associated with at least one synchronization signal block (SSB) is configured, and a reference signal received power (RSRP) of an SSB among the at least one SSB is above a threshold;
    identifying a random access preamble corresponding to the SSB, in case that the criteria is met during the backoff time; and
    transmitting, to a base station, the random access preamble in a physical random access channel (PRACH) occasion corresponding to the SSB.

2. The method of claim 1, wherein a random access resource selection is performed after the backoff time, in case that the criteria is not met.

3. The method of claim 1, further comprising:
    receiving information related to a backoff indicator,
    wherein the backoff time is selected based on the backoff indicator, in case that a random access response window expires or a contention resolution timer expires.

4. The method of claim 1, wherein the backoff time is stopped, in case that the criteria is met.

5. The method of claim 1,
    wherein the criteria is identified to be met, in case that a random access procedure is initiated by a physical downlink control channel (PDCCH) order, and the PDCCH order includes a preamble index not equal to 0, or
    wherein the criteria is identified to be met, in case that the random access procedure is initiated for a beam failure recovery and a beam failure recovery timer is running or not configured, and the RSRP of the SSB is above the threshold.

6. A method performed by a base station in a wireless communication system, the method comprising:
    transmitting, to a terminal, information on a backoff time associated with a random access procedure; and
    receiving, from the terminal, a random access preamble in a physical random access channel (PRACH) occasion,
    wherein whether a criteria to select a contention free random access resource is met is identified during the backoff time,
    wherein the criteria is identified to be met in case that at least one contention free random access resource associated with at least one synchronization signal block (SSB) is configured, and a reference signal received power (RSRP) of an SSB among the at least one SSB is above a threshold, and
    wherein the random access preamble corresponding to the SSB is received in the PRACH occasion corresponding to the SSB, in case that the criteria is met during the backoff time.

7. The method of claim 6, wherein a random access resource selection is performed after the backoff time, in case that the criteria is not met.

8. The method of claim 6,
    wherein the information includes information related to a backoff indicator, and
    wherein the backoff time is selected based on the backoff indicator, in case that a random access response window expires or a contention resolution timer expires.

9. The method of claim 6, wherein the backoff time is stopped, in case that the criteria is met.

10. The method of claim 6,
    wherein the criteria is identified to be met, in case that a random access procedure is initiated by a physical downlink control channel (PDCCH) order, and the PDCCH order includes a preamble index not equal to 0, or wherein the criteria is identified to be met, in case that the random access procedure is initiated for a beam failure recovery and a beam failure recovery timer is running or not configured, and the RSRP of the SSB is above the threshold.

11. A terminal in a wireless communication system, the terminal comprising:
a transceiver configured to transmit and receive a signal; and
a controller coupled with the transceiver and configured to:
select a backoff time associated with a random access procedure,
identify whether a criteria to select a contention free random access resource is met, during the backoff time, wherein the criteria is identified to be met in case that at least one contention free random access resource associated with at least one synchronization signal block (SSB) is configured, and a reference signal received power (RSRP) of an SSB among the at least one SSB is above a threshold,
identify a random access preamble corresponding to the SSB, in case that the criteria is met during the backoff time, and
transmit, to a base station, the random access preamble in a physical random access channel (PRACH) occasion corresponding to the SSB.

12. The terminal of claim 11, wherein a random access resource selection is performed after the backoff time, in case that the criteria is not met.

13. The terminal of claim 11,
wherein the controller is further configured to receive information related to a backoff indicator, and
wherein the backoff time is selected based on the backoff indicator, in case that a random access response window expires or a contention resolution timer expires.

14. The terminal of claim 11, wherein the backoff time is stopped, in case that the criteria is met.

15. The terminal of claim 11,
wherein the criteria is identified to be met, in case that a random access procedure is initiated by a physical downlink control channel (PDCCH) order, and the PDCCH order includes a preamble index not equal to 0, or
wherein the criteria is identified to be met, in case that the random access procedure is initiated for a beam failure recovery and a beam failure recovery timer is running or not configured, and the RSRP of the SSB is above the threshold.

16. A base station in a wireless communication system, the base station comprising:
a transceiver configured to transmit and receive a signal; and
a controller coupled with the transceiver and configured to:
transmit, to a terminal, information on a backoff time associated with a random access procedure, and
receive, from the terminal, a random access preamble in a physical random access channel (PRACH) occasion,
wherein whether a criteria to select a contention free random access resource is met is identified during the backoff time,
wherein the criteria is identified to be met in case that at least one contention free random access resource associated with at least one synchronization signal block (SSB) is configured, and a reference signal received power (RSRP) of an SSB among the at least one SSB is above a threshold, and
wherein the random access preamble corresponding to the SSB is received in the PRACH occasion corresponding to the SSB, in case that the criteria is met during the backoff time.

17. The base station of claim 16, wherein a random access resource selection is performed after the backoff time, in case that the criteria is not met.

18. The base station of claim 16,
wherein the information includes information related to a backoff indicator, and
wherein the backoff time is selected based on the backoff indicator, in case that a random access response window expires or a contention resolution timer expires.

19. The base station of claim 16, wherein the backoff time is stopped, in case that the criteria is met.

20. The base station of claim 16,
wherein the criteria is identified to be met, in case that a random access procedure is initiated by a physical downlink control channel (PDCCH) order and the PDCCH order includes a preamble index not equal to 0, or
wherein the criteria is identified to be met, in case that the random access procedure is initiated for a beam failure recovery and a beam failure recovery timer is running or not configured, and the RSRP of the SSB is above the threshold.

* * * * *